United States Patent [19]
Lu
[11] 4,298,650
[45] Nov. 3, 1981

Best Available Copy

[54] PHOSPHORESCENT SCREENS

[75] Inventor: Chen-i Lu, Webster, N.Y.
[73] Assignee: Eastman Kodak Company, Rochester, N.Y.

[21] Appl. No.: 136,144
[22] Filed: Mar. 31, 1980
[51] Int. Cl.$^3$ .......................... B32B 3/26; B32B 5/16
[52] U.S. Cl. .................................. 428/306; 427/157; 427/373; 428/309; 428/328; 428/330; 521/137
[58] Field of Search ............... 428/304, 306, 309, 328, 428/330, 402, 403, 407; 427/54.1, 157, 373

[56] References Cited

U.S. PATENT DOCUMENTS 4,188,449 2/1980 Lu et al. ............................ 427/54.1

*Primary Examiner*—William J. Van Balen
*Attorney, Agent, or Firm*—Alfred P. Lorenzo

[57] ABSTRACT

Phosphorescent screens which are useful for such purposes as intensifying screens for radiographs are comprised of a support bearing a layer of finely-divided particles of a phosphor dispersed in a cross-linked polymeric matrix formed by heat-curing of a coating composition comprising an unsaturated cross-linkable polymer, a polymerizable acrylic monomer, a thermoplastic polyurethane elastomer, and a heat-activatable polymerization initiator. The phosphor layer includes voids formed by evaporation of an evaporable component which is present in the coating composition from which such layer is formed.

39 Claims, No Drawings

PHOSPHORESCENT SCREENS

BACKGROUND OF THE INVENTION

1. Field of the Invention

This invention relates in general to phosphorescent screens and in particular to phosphorescent screens which are useful for such purposes as intensifying screens for radiographs. More specifically, this invention relates to phosphorescent screens which comprise a layer of finely-divided phosphor particles dispersed in a polymeric binder, to a process for production of such screens in which heat-curing of the binder is utilized, and to a coating composition for use in the manufacture of the aforesaid screens.

2. Description of the Prior Art

It is well known to prepare phosphorescent screens by coating a support with a composition comprising phosphor particles, a polymeric binder and a solvent, and drying the coating to remove the solvent and leave an adherent layer comprised of phosphor particles dispersed in the binder. A wide variety of polymeric materials have been disclosed in the prior art for use as a binding agent for the phosphor particles. Among such materials are the polyvinyl butyral of U.S. Pat. No. 3,043,710, the nylon resins of U.S. Pat. No. 3,300,310, the acrylic acid/alkyl acrylate copolymers of U.S. Pat. No. 3,300,311, the polycarbonates of U.S. Pat. Nos. 3,617,285 and 3,712,827, and the polyurethane elastomers of U.S. Pat. No. 3,743,833. Typically, the process of forming the screen involves the use of an organic solvent to form a dispersion of phosphor in binder and employs a drying step in which the solvent is removed by evaporation either at room temperature or at an elevated temperature. However, aqueous systems can also be used as in the case of the water-soluble copolymers of U.S. Pat. No. 3,300,311 and in U.S. Pat. No. 3,776,754 which describes a process for manufacture of screens for color television tubes in which corpuscular radiation is employed to cure selected areas of a radiation-curable layer formed by coating an aqueous composition containing binder and phosphor.

Prior methods of forming phosphorescent screens which comprise a layer of phosphor particles dispersed in a polymeric binder suffer from serious disadvantages which significantly restrict the usefulness of the resulting materials. For example, the phosphor layer may not adhere well to the support, or while having adequate adhesive strength, it may lack the necessary cohesive strength. Due to the brittle character of some binders, the screen may not possess adequate flexibility and resistance to cracking and crazing. The radiographic speed of the screen may be unduly low due to the adverse effects of the binder, or the binder may not be able to accept sufficiently high loadings of phosphor particles. Because of inadequate durability of the phosphor layer or insufficient resistance to soiling, it may be essential to have a protective overcoat layer and because of the poor flatness characteristics of the screen, it may be essential to have an anti-curl layer. Such additional layers add substantially to the cost of the product and greatly complicate the manufacturing process. Still other problems associated with prior art phosphorescent screens are inadequate dimensional stability, discoloration upon aging, and excessive change in properties with changes in temperature and/or humidity. Moreover, many of the prior art phosphorescent screens require manufacturing processes which are unduly slow or difficult to carry out, and some require the use of toxic and hazardous solvents which must be evaporated in substantial quantities.

Improved phosphorescent screens having a highly desirable combination of properties not possessed by screens known theretofore are disclosed in Lu et al, U.S. Pat. No. 4,188,449, issued Feb. 12, 1980. These screens are manufactured by a process comprising the steps of (1) coating a support with a radiation-curable composition comprising a suspension of finely-divided phosphor particles in a viscous liquid composition containing a first component that is capable of being radiation-cured to form a cross-linked polymeric matrix surrounding the phosphor particles and a second component that is capable of being evaporated to generate voids within the matrix, (2) irradiating the coating to cure the first component and form thereby a cross-linked polymeric matrix surrounding the phosphor particles, and (3) evaporating the second component simultaneously with or subsequently to the irradiating step to thereby generate voids within the matrix. While screens prepared by this process represent an important advance in the art, they suffer from certain significant disadvantages which have limited their usefulness. For example, the radiation-cured phosphor layer is not soluble in common solvents, which makes it very difficult to recover phosphor from coating scrap and thereby adds significantly to manufacturing costs.

It is toward the objective of providing phosphorescent screens which possess the advantageous combination of properties of the screens of U.S. Pat. No. 4,188,449, while additionally exhibiting solubility in common solvents which facilitates recovery of phosphor from coating scrap, that the present invention is directed.

SUMMARY OF THE INVENTION

In accordance with this invention, phosphorescent screens are comprised of a support and a layer of finely-divided particles of a phosphor dispersed in a cross-linked void-containing polymeric matrix. The phosphor layer is formed by coating the support with a coating composition comprising a suspension of finely-divided phosphor particles in a viscous liquid composition that contains a first component that is capable of being heat-cured to form a cross-linked polymeric matrix surrounding the phosphor particles and a second component that is capable of being evaporated to generate voids within the matrix. The first component comprises an unsaturated crosslinkable polymer, a polymerizable acrylic monomer, a thermoplastic polyurethane elastomer, and a heat-activatable polymerization initiator. The coating is heated for a time and at a temperature sufficient to cure the first component and thereby form the polymeric matrix and evaporate the second component to thereby generate the voids within the matrix.

Phosphorescent screens produced by the method described herein are highly resistant to delamination, cracking or crazing in view of the excellent adhesive and cohesive strength of the phosphor layer. They have excellent dimensional stability, are resistant to the effects of temperature and humidity change and resistant to discoloration on aging. They are durable and abrasion resistant to such an extent that a protective overcoat layer is not needed, and they have excellent flatness characteristics which render unnecessary the inclusion of a curl control layer. At the same time, they possess high radiographic speed (the particular speed attained being, of course, dependent in part on the particular phosphor utilized) and are capable of providing excellent contrast and image sharpness. They are easily prepared by a relatively simple, inexpensive process which can be carried out in a very short period of time and which avoids the need to utilize hazardous and toxic solvents. Additionally, they are well adapted to facilitate phosphor recovery from coating scrap generated in the manufacturing operation, since the phosphor layer is soluble in common inexpensive solvents.

DESCRIPTION OF THE PREFERRED EMBODIMENTS

The phosphorescent screens of this invention can be prepared from a wide variety of different materials, with the choice of materials used depending on the specific manufacturing techniques employed and the specific properties which are of greatest significance for the particular end use for which the screens have been designed. Methods of coating and heat-curing to form the desired product are similarly capable of widespread variation. Control of the degree to which voids are formed in the phosphor-containing layer is easily achieved by selection of an appropriate amount of the evaporable component in the coating composition. This freedom of choice and the ability of the process to be successfully applied to a wide variety of starting materials are important advantageous features of the invention.

The support for the phosphorescent screens of this invention can be composed of any suitable material. For example it can be paper, baryta-coated paper, polymer-coated paper such as polyethylene-coated paper, a metal foil such as aluminum foil, or a foil-paper laminate. The support can also be a polymeric film such as a film formed from cellulose acetate, cellulose propionate, cellulose acetate propionate, cellulose acetate butyrate, polyethylene, polystyrene, poly(vinyl chloride), polymethyl methacrylate, vinyl chlorideacetate copolymer, polypropylene, poly(vinyl acetals), polycarbonates, polysulfones, polyethersulfones, polyimides, polyamides, or polyesters. Films formed from polyethylene terephthalate are especially useful. The thickness of the support will typically be in the range from about 4 to about 15 mils and preferably in the range from about 5 to about 7 mils.

The phosphors that are useful in forming the phosphorescent screens of this invention are well known materials. Typical examples of such phosphors include calcium tungstate, barium lead sulfate, zinc cadmium sulfide, lead-activated barium silicate, lead-activated strontium sulfate, gadolinium-activated yttrium oxide, europium-activated barium strontium sulfate, europiumactivated barium lead sulfate, europium-activated yttrium vanadate, europium-activated yttrium oxide, europium-activated barium phosphate, terbium-activated gadolinium oxysulfide, terbium-activated lanthanum oxysulfide, magnesium gallate, and the like. Mixtures of two or more of the aforesaid phosphors can be employed, if desired. The phosphor is utilized in finely-divided particulate form. A preferred average particle size for the phosphor is in the range from about 1 to 100 microns and most preferably in the range from about 6 to about 18 microns.

To form the phosphorescent screen, the support is coated with a suspension of the finely-divided phosphor particles in a viscous liquid composition, as hereinafter described. The coating composition should be of a viscosity suitable to maintain the phosphor particles in suspension and yet permit easy coating at high coating speeds of a layer of uniform thickness. Optimum viscosity will, of course, be dependent upon numerous factors such as the particular method of coating and the size and density of the phosphor particles, but will typically be in the range from about 500 to about 30,000 centipoises at room temperature and more usually in the range from about 5,000 to about 15,000 centipoises. The phosphor layer can vary in wet thickness from about 2 mils or less up to about 25 mils or more and will most usually be in the range from about 3 to about 12 mils. In manufacturing screens by the method of this invention, the dry thickness of the phosphor layer will not usually be significantly different than the wet thickness after coating, since the heat-curing step forms the entire binder into a polymeric matrix, and the only component removed from the coating is the void-generating component.

Coating of the support with the suspension of finely-divided phosphor particles in a viscous liquid composition can be carried out in any suitable manner. For example, it can be carried out by air-knife coating, roll coating, gravure coating, extrusion coating, bead coating, curtain coating, use of wire wound coating rods, and so forth.

A first essential ingredient of the heatcurable component of the coating composition of this invention is an unsaturated crosslinkable polymer. A wide variety of such materials are known and the term "an unsaturated crosslinkable polymer," as used herein, is intended to encompass all such materials, including oligomers as well as high polymers. Illustrative classes of polymers which are useful include epoxy diacrylates, unsaturated polyesters, unsaturated acrylics, unsaturated polybutadienes, unsaturated acrylic modified polyurethanes, unsaturated acrylic modified polythioethers, acrylated glycols and polyols, unsaturated acrylic-terminated polybutadienes and polybutadiene/acrylonitriles, and the like. Specific examples of useful polymers are an epichlorohydrin/bisphenol-A epoxy that is reacted with acrylic acid or methacrylic acid to form acrylate or methacrylate ester end groups at both ends of the epoxy chain, as well as similar polymers prepared from novolac epoxides (fusible and soluble epoxy resins formed by condensation of a phenol with an aldehyde under acid conditions). Further examples of useful polymers are a bisphenol-A/fumaric acid polyester and a di(hydroxypropyl acrylateanhydride) modified bisphenol-A/epichlorohydrin epoxy. Oligomers can be used in the heat-curable composition in place of or in addition to the aforesaid polymers, for example, a polyoxyethylene diacrylate oligomer.

Further examples of polymeric materials useful in coating compositions which are suitably employed in the method of this invention are described in numerous patents, for example in U.S. Pat. Nos. 3,367,992; 3,551,235; 3,554,886; and 3,558,387.

Particularly preferred coating compositions for the purpose of forming the phosphorescent screens of this invention are compositions comprising an acrylated epoxy resin. The acrylated epoxy resins are well known materials, and resins of this type have been described in numerous patents, for example in U.S. Pat. Nos. 3,661,576; 3,673,140; 3,713,864; and 3,772,062 and in British patent No. 1,375,177. Typical resins of this type are those derived from bisphenols. In a preferred embodiment of this invention, the acrylated epoxy resin is a reaction product of epichlorohydrin, bisphenol-A and an acrylic monomer, such reaction product being represented by the formula:

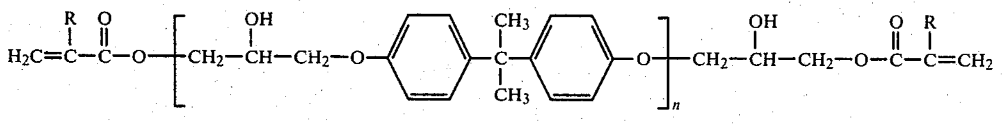

wherein R is a hydrogen atom or a methyl group and n is 1 to 20. These reaction products are relatively viscous liquids when n is low, e.g., 1 to 3, which become increasingly viscous as the value of n increases and are solids when n is high, e.g., 10 to 20.

A further example of a preferred class of unsaturated crosslinkable polymers useful for the purpose of forming the polymeric matrix of this invention is the class of acrylated urethane resins. Materials of this type are described, for example, in U.S. Pat. Nos. 3,509,234; 3,600,539; 3,694,415; 3,719,638 and 3,775,377 and in British patent No. 1,321,372. The acrylated urethane resins can be used by themselves or in combination with a different class of resins such as the acrylated epoxy resins.

A second essential ingredient of the heatcurable component of the coating composition of this invention is a polymerizable acrylic monomer. These monomers are liquids of relatively low viscosity. In the curing step they are converted, together with the unsaturated crosslinkable polymer, to a solid cross-linked polymeric matrix. Because they tend to be more reactive than the unsaturated crosslinkable polymers, they function to increase the rate of polymerization and cross-linking. Useful acrylic monomers include mono-functional monomers and polyfunctional monomers. Examples of monofunctional acrylic monomers that are useful in the coating compositions of this invention include acrylic and methacrylic esters such as ethyl acrylate, butyl acrylate, 2-hydroxypropyl acrylate, cyclohexyl acrylate, 2-ethylhexyl acrylate, methyl methacrylate, ethyl methacrylate, and the like. Examples of polyfunctional acrylic monomers that are useful include:

neopentylglycol diacrylate,
pentaerythritol thriacrylate,
1,6-hexanediol diacrylate,
trimethylolpropane triacrylate,
tetraethylene glycol diacrylate,
1,3-butylene glycol diacrylate,
trimethylolpropane trimethacrylate,
1,3-butylene glycol dimethacrylate,
ethylene glycol dimethacrylate,
pentaerythritol tetraacrylate,
tetraethylene glycol dimethacrylate,
1,6-hexanediol dimethacrylate,
ethylene glycol diacrylate,
diethylene glycol diacrylate,
glycerol diacrylate,
glycerol triacrylate,
1,3-propanediol diacrylate,
1,3-propanediol dimethacrylate,
1,2,4-butanetriol trimethacrylate,
1,4-cyclohexanediol diacrylate,
1,4-cyclohexanediol dimethacrylate,
pentaerythritol diacrylate,
1,5-pentanediol dimethacrylate, and the like.

Preferred polyfunctional acrylic monomers are those of the formula:

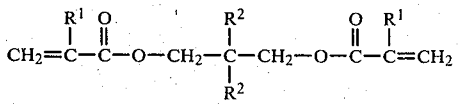

where each $R^1$ is independently selected from the group consisting of a hydrogen atom and an alkyl group of 1 to 2 carbon atoms, each $R^2$ is independently selected from the group consisting of an alkyl group of 1 to 6 carbon atoms and a radical of the formula:

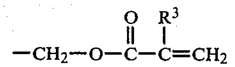

in which $R^3$ is a hydrogen atom or an alkyl group of 1 to 2 carbon atoms.

A third essential ingredient of the heatcurable component of the coating composition of this invention is a thermoplastic polyurethane elastomer. The thermoplastic polyurethane elastomers are well known materials. They include polyester-based polyurethanes and polyether-based polyurethanes. The polyester-based polyurethanes are prepared from a diol, such as 1,4-butanediol or 1,6-hexanediol, a diacid, such as adipic acid, and a diisocyanate, such as toluenediisocyanate or 4,4'-diphenylmethane-diisocyanate. The polyether-based polyurethanes are prepared from a polyether, such as a polyether derived from ethylene or propylene oxide, and a diisocyanate. Either aliphatic or aromatic diisocyanates can be used in the preparation of thermoplastic polyurethane elastomers. Details concerning thermoplastic polyurethane elastomers useful in the coating compositions of this invention are provided in U.S. Pat. No. 3,743,833, the disclosure of which is incorporated herein by reference.

Commercially available thermoplastic polyurethane elastomers which can be employed in the coating compositions of this invention include those sold under the trademark ESTANE by B. F. Goodrich Chemical Company and those sold under the trademark PERMUTHANE by the Permuthane Division of Beatrice Foods Company.

The thermoplastic polyurethane elastomers are used in small amounts in the coating composition. They function to improve flexibility and toughness of the cured layer and provide sites for solvent extraction in the phosphor recovery process. It is believed that they exist in the cured layer in the form of a "micro random dispersion." Because of their presence, the cured layer is soluble in common inexpensive solvents such as methylene chloride or methyl ethyl ketone. In contrast, the radiation-cured phosphor layers of U.S. Pat. No. 4,188,449 are not soluble in such solvents, which makes it very difficult to recover the phosphor from manufacturing scrap by the use of inexpensive and practical recovery techniques.

A fourth essential ingredient of the heatcurable component of the coating composition of this invention is a heat-activatable polymerization initiator. Useful heat-activatable polymerization initiators include azo compounds, peroxides, peracetates, and percarbonates. The azo initiators are preferred since they provide cured layers which are free from such undesirable characteristics as brittleness. Examples of useful azo initiators include:

2,2′-azobis(isobutyronitrile)
2,2′-azobis(2,4-dimethyl-4-methoxyvaleronitrile)
2,2′-azobis(2,4-dimethylvaleronitrile)
1,1′-azobis(cyclohexanecarbonitrile)
4,4′-azobis(4-cyanovaleric acid)
2-t-butylazo-2-cyanobutane
1-t-butylazo-1-cyanocyclohexane
2-t-butylazo-2-cyanopropane
2-t-butylazo-2-cyano-4-methoxy-4-methylpentane
2-t-butylazo-2-cyano-4-methylpentane ethylene bis(4-t-butylazo-4-cyano-valerate)
4-(4-t-butylazo-4-cyanovaleryloxy)-2-hydroxybenzophenone
2-(t-butylazo)-isobutyronitrile
t-butylazoformamide
2-t-butylazo-2-phthalimido-4-methylpentane
2-t-butylazo-2-thiophenoxy-4-methylpentane
2-t-butylazo-2,4-dimethoxy-4-methylpentane
2-t-butylazo-2-methoxy-4-methylpentane
1-t-butylazo-1-methoxycyclohexane
1-t-butylazo-1-phenoxycyclohexane and the like.

It is a particularly important feature of this invention that the viscous liquid composition in which the phosphor particles are suspended contain a void-generating agent, for example a solvent which is readily evaporable. This agent must, of course, be a material which is not cured by the heat-curing step and which can be evaporated to generate voids within the polymeric matrix. It must also be a material which does not adversely affect the binder materials, such as by chemically reacting therewith, or which renders the composition incapable of being coated or incapable of adhering to the support. Since the void-generating agent must not enter into the curing reaction to thereby become part of the matrix, it should not be a polymerizable material, for example, it should be free of ethylenic unsaturation. Preferably the void-generating agent should be relatively volatile in order to facilitate the generation of voids. The void-generating agent can, in addition to forming the voids, also serve to solubilize one or more of the components which form the polymeric matrix. Within these parameters, the void-generating agent can be selected from a wide variety of suitable materials. Typical examples of classes of materials which are useful as the void-generating agent in the process of this invention include ketones such as acetone or methyl ethyl ketone, hydrocarbons such as benzene or toluene, ethers such as tetrahydrofuran, alcohols such as methanol or isopropanol, halogenated alkanes such as ethylene dichloride or propylene dichloride, esters such as ethyl acetate or butyl acetate, and the like. Combinations of two or more of these organic solvents can, of course, be utilized as the void-generating if desired. Preferably, the void generating agent is an organic liquid having a normal boiling point in the range from about 40° C. to about 85° C. As an alternative to the use of a liquid material as the void-generating agent, there can be used, if desired, a solid which sublimes or decomposes on heating. Such solid materials should be utilized in very finely-divided form. Examples of solid materials which will sublime and thereby bring about the desired generation of voids include camphor, solid carbon dioxide, pyrogallol, salicylic acid, resorcinol, phenol, and the like. Examples of solid materials which will undergo heat decomposition and thereby bring about the desired generation of the voids include p-hydroxybenzoic acid, trihydroxybenzoic acid, sodium bicarbonate, azobisisobutyronitrile, benzene sulfonyl hydrazide, and the like.

As used herein, the term "voids" is intended to refer to microscopic-sized gas bubbles. When reference is made herein to a component capable of being evaporated to generate voids it is, as indicated above, intended to include within the term "evaporated" the processes of sublimation or decomposition of a solid void-generating agent.

As indicated above, the essential components of the coating composition are, in addition to the phosphor, the component that is heat-curable to form the solid cross-linked polymeric matrix and a void-generating agent. Other ingredients can optionally be included. For example, the coating composition can contain viscosity regulating agents such as silica and surfactants which facilitate the formation of the phosphor dispersion such as fluorocarbons, silicones, alkyl aryl polyether sulfates, phosphate esters, and the like.

A preferred coating composition for use in forming the phosphorescent screens of this invention is a dispersion of a phosphor in a liquid medium composed of an acrylic ester, an acrylated epoxy resin, a thermoplastic polyurethane elastomer, an azo initiator, and a ketone. A particularly preferred coating composition is a dispersion of a phosphor in a liquid medium composed of butyl acrylate, an acrylated epoxy resin of the formula given hereinabove in which n is in the range of 10 to 15, a thermoplastic polyurethane elastomer, 2,2′-azobis-(isobutyronitrile) and methyl ethyl ketone.

Curing of the coated layer is carried out by heating for a time and at a temperature sufficient to cure the heat-curable component, to thereby form a cross-linked polymeric matrix surrounding the phosphor particles, and to evaporate the evaporable component, to thereby generate voids within the matrix. The specific curing conditions utilized should take into account the particular coating composition employed and the wet thickness of the coated layer. Typical curing conditions involve heating at a temperature in the range of from about 50° C. to about 150° C. for a time in the range of from about 5 to about 30 minutes, preferably at a temperature in the range of from about 70° C. to about 120° C. for a time in the range of from about 10 to about 15 minutes.

In the curing step employed in the manufacture of the phosphorescent screens of this invention, heating of the wet coated layer first initiates polymerization and/or cross-linking at the surface with the result that there is a tendency for a crust to form. As the heating continues, the polymerization and/or cross-linking proceeds deeper into the coated layer until eventually all of the binder is formed into a polymeric matrix. While the generation of the matrix is taking place, the void-generating agent gradually evaporates to form bubbles. The crust and the high viscosity of the coating composition inhibit escape, collapse or coalescence of the bubbles, but the gas diffuses to the surface where it passes into the atmosphere. This eventually results in the generation of voids with essentially no residual void-generating agent remaining in the phosphor layer. Little or no collapse or shrinking of the coated layer takes place, so that the dry fully-cured layer is substantially as thick as the wet layer. The percentage of voids is easily controlled to a desired level by the use of smaller or greater amounts of the void-generating agent in the coating composition. The amount of void-generating agent employed can be varied widely. Typically, the percentage by weight of void-generating agent based on the total weight of the coating composition will be in the range from about 2 to about 35% and preferably in the range from about 5 to about 15%.

It is desirable that the phosphor layer be of relatively slight thickness, as a thick layer tends to result in lower radiographic speed and poorer image sharpness. At the same time it is desirable to provide a large quantity of phosphor per unit area of support in order to provide high radiographic speed. To meet these requirements it is necessary to provide a high ratio of phosphor to polymeric binder. Ratios of phosphor to binder of at least about 5 to 1 and more preferably at least about 10 to 1 on a weight basis are desirable, and the method of this invention is amenable to use of such high phosphor to binder ratios. Phosphor coverage in the screen can vary widely, as desired, and is typically in the range from about 10 to about 100 grams/$ft^2$ and preferably in the range from about 30 to about 80 grams/$ft^2$.

The proportions in which the unsaturated cross-linkable polymer, the polymerizable acrylic monomer, the thermoplastic polyurethane elastomer and the heat-activatable polymerization initiator are used can be varied widely as desired. Good results are usually obtained with coating compositions in which the unsaturated cross-linkable polymer makes up about 7 to about 15 percent of the total weight of the coating composition. The polymerizable acrylic monomer is advantageously employed in an amount of from about 0.1 to about 1.5 parts per part by weight of the unsaturated cross-linkable polymer. The thermoplastic polyurethane elastomer is used in small amounts, typically an amount of from about 0.05 to about 0.2 parts per part by weight of the unsaturated cross-linkable polymer. Amounts of the heat-activatable polymerization initiator in the range of from about 0.02 to about 0.1 parts per part by weight of the unsaturated cross-linkable polymer ordinarily provide satisfactory results.

Control of the degree to which voids are present in the polymeric matrix is an important feature of the present invention. If the percentage of void volume is too low, the radiographic speed will be adversely affected. On the other hand, too high a percentage of void volume reduces the strength and durability of the phosphor layer and involves the evaporation of greater quantities of void-generating agent and, accordingly, additional energy requirements to provide the necessary heat. Preferably the phosphorescent screens of this invention comprise a phosphor layer with a percentage of void volume of about 1 percent to about 20 percent, by volume, more preferably from about 5 to about 15 percent, and most preferably about 10 percent.

The phosphorescent screens described herein are especially useful as intensifying screens for radiographs. They are useful in integral or non-integral combination with image-forming photographic materials, for example, they can be used in non-integral combinations in which the phosphor layer of the screen is held in contact with an image-forming layer of a separate photographic element, or in integral combination in a composite photographic element and intensifying screen combination comprised of a support, the phosphor layer, and an image-forming layer. Typically, the image-forming layer will be a gelatino/silver halide emulsion layer. The excellent flatness, smoothness and flexibility of the phosphor layer of the screens of this invention greatly facilitates the intimate and uniform contact between the surfaces of the screen and the photographic material that is desirable in non-integral combinations.

While not ordinarily necessary with the phosphorescent screens of this invention, protective overcoats and curl control layers can, of course, be used if desired. Also, if the support is one with which it is difficult to achieve adequate adhesion of the phosphor layer, then a suitable subbing layer can be utilized as is well known in the art.

In a preferred embodiment of the invention, the radiographic speed of the phosphorescent screen is increased by using a reflective support rather than a transparent support. When a transparent support is used, it transmits some phosphorescence, generated from the excited phosphor during the exposure to X-ray radiation, to the side opposite the photographic film where it produces no exposure of the photographic film and thereby lowers the radiographic speed. By using a reflective support instead of a transparent support, for example, baryta-coated paper or bright silver coated polyester film, such as a film with a 300 mg/$ft^2$ coating of electrolytically deposited silver, the phosphorescence is re-directed toward the hotographic film to increase its exposure.

The invention is further illustrated by the following examples of its practice.

In the examples which follow, reference to void content refers to measurement of the percentage voids by volume in the phosphor layer measured in the following manner:

A six inch square piece of the phosphorescent screen is weighed and its thickness is measured. Void volume is determined by subtracting the volume of the support, phosphor and binder, as determined using the known density and weight fraction of each, from the total volume of the screen. Percentage voids is calculated from the value obtained for void volume.

Reference to radiographic speed refers to speed measurement made in the following manner:

A film-screen combination which serves as a standard of comparison is formed by sandwiching a section of Kodak X-OMATIC G Film 4510 between a pair of Kodak X-OMATIC phosphor screens. A second film-screen combination is prepared by sandwiching a section of the same film between a pair of screens, each of which has been prepared by the method of the present invention. Each combination is exposed to X-ray radiation at the same dose and dose rate and then the exposed film is processed at standard conditions and the neutral density is determined. The X-OMATIC screen is assigned a radiographic speed (SR) of 103. In evaluating the test screen, each incremental difference of $\pm 0.035$ in neutral density, as compared to the standard screen, is defined as an SR change of $\pm 1$.

EXAMPLE 1

A coating composition was prepared from the following ingredients:

| Component | Parts by Weight |
|---|---|
| Phosphor(1) | 13 |
| Acrylated epoxy resin(2) | 1.49 |
| Butyl acrylate | 1.17 |
| Methyl ethyl ketone | 0.85 |
| Benzoin | 0.035 |
| Thermoplastic polyurethane elastomer(3) | 0.21 |
| 2,2'-Azobis(isobutyronitrile) | 0.07 |

(1) The phosphor was finely-divided europium-activated barium strontium sulfate having a particle size of 4 to 10 microns.
(2) The acrylated epoxy resin was a condensation product of epichlorohydrin and bisphenol-A (molar ratio of 1.6:1) reacted with methacrylic acid to form ester end groups and is represented by the formula:

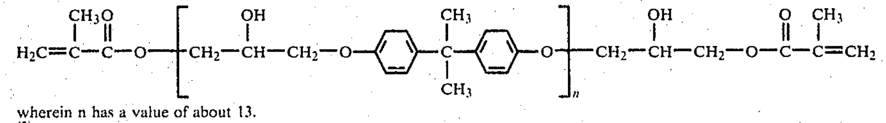

wherein n has a value of about 13.
(3) The thermoplastic polyurethane elastomer was ESTANE Polyurethane 5702 manufactured by B. F. Goodrich Chemical Company.

The coating composition was coated as a layer with a wet thickness of 12 mils on a poly(ethylene terephthalate) film having a thickness of 7 mils. The phosphor layer was dried overnight at room temperature and then cured by heating at 80° C. for 10 minutes. The void content of the phosphor layer was 19.5%, the phosphor coverage was 58 gm/ft$^2$, and the radiographic speed was 118.

A second sample was prepared in which the coating composition was coated as a layer with a wet thickness of 10.4 mils, dried overnight at room temperature, and then cured by heating at 80° C. for 10 minutes. The void content of the phosphor layer was 19.5%, the phosphor coverage was 42 gm/ft$^2$, and the radiographic speed was 107.

With both samples, the phosphor layer was found to dissolve readily in common solvents such as methylene chloride and methyl ethy ketone, thereby making it an easy matter to recover the phosphor from coating scrap.

EXAMPLE 2

A coating composition was prepared from the following ingredients:

| Component | Parts by Weight |
|---|---|
| Phosphor of Example 1 | 13 |
| Acrylated epoxy resin of Example 1 | 0.30 |
| Acrylated polyurethane resin(1) | 1.12 |
| 2-Ethylhexyl acrylate | 0.28 |
| Butyl acrylate | 1.16 |
| Methyl ethyl ketone | 0.66 |
| Thermoplastic polyurethane elastomer of Example 1 | 0.17 |
| 2,2'-Azobis(isobutyronitrile) | 0.07 |

(1) The acrylated polyurethane resin was CARGILL XP-1030-47 resin manufactured by the Cargill Corporation.

The coating composition was coated as a layer with a wet thickness of 4.7 mils on a poly(ethylene terephthalate) film having a thickness of 7 mils, and the phosphor layer was cured by heating at 88° C. for 15 minutes. The void content of the phosphor layer was 2.3%, the phosphor coverage was 25 gm/ft$^2$, and the radiographic speed was 98.

Three additional samples were prepared in which the coating composition was coated at greater thicknesses and cured under the same conditions. Results obtained were as follows:

| Phosphor Coverage (gm/ft$^2$) | Void Content (%) | Radiographic Speed |
|---|---|---|
| 35 | 2.6 | 106 |
| 41 | 3.5 | 111 |
| 47 | 4.1 | 115 |

With all of the samples, the phosphor layer was found to dissolve readily in common solvents such as methylene chloride and methyl ethyl ketone.

For purposes of comparison, a coating composition was prepared from the following ingredients:

| Component | Parts by Weight |
|---|---|
| Phosphor of Example 1 | 11 |
| Thermoplastic polyurethane elastomer of Example 1 | 1 |
| Tetrahydrofuran | 4.2 |

The coating composition was coated in an amount sufficient to provide a dry thickness of 10 mils on a poly(ethylene terephthalate) film having a thickness of 7 mils and dried in an oven in which it was maintained at a temperature of about 38° C. for about 30 minutes followed by a temperature of about 80° C. for about 10 minutes. The void content of the phosphor layer was 31%, the phosphor coverage was 55 gm/ft$^2$, and the radiographic speed was 103. Comparing these characteristics with those reported above for screens prepared in accordance with the present invention, it is apparent that the screens of the present invention provide significant advantages in that they exhibit higher speeds at lower phosphor coverages.

The invention has been described in detail with particular reference to preferred embodiments thereof, but it will be understood that variations and modifications can be effected within the spirit and scope of the invention.

I claim:

1. A phosphorescent screen comprising a support and a layer of finely-divided particles of a phosphor dispersed in a cross-linked, void-containing polymeric matrix, said layer having been formed by:

(1) coating said support with a heat-curable composition comprising a suspension of said finely-divided phosphor particles in a viscous liquid composition, said viscous liquid composition comprising a first component that is capable of being heat-cured to form a cross-linked polymeric matrix surrounding said phosphor particles and a second component that is capable of being evaporated to generate voids within said matrix, said first component comprising:

(a) an unsturated crosslinkable polymer,
(b) a polymerizable acrylic monomer,
(c) a thermoplastic polyurethane elastomer, and
(d) a heat-activatable polymerization initiator, and (2) heating said coating for a time and at a temperature sufficient to cure said first component, to thereby form a cross-linked polymeric matrix surrounding said phosphor particles, and to evaporate said second component, to thereby generate voids within said matrix.

2. A phosphorescent screen as claimed in claim 1 wherein the void content of said phosphor layer is in the range of from about 1 to about 20 percent by volume.

3. A phosphorescent screen as claimed in claim 1 wherein the void content of said phosphor layer is in the range from about 5 to about 15 percent by volume.

4. A phosphorescent screen as claimed in claim 1 wherein the void content of said phosphor layer is about 10 percent by volume.

5. A phosphorescent screen as claimed in claim 1 wherein the particle size of said phosphor particles is in the range from about 1 to about 100 microns.

6. A phosphorescent screen as claimed in claim 1 wherein said phosphor is europium-activated barium strontium sulfate.

7. A phosphorescent screen as claimed in claim 1 wherein said unsaturated crosslinkable polymer is an acrylated epoxy resin.

8. A phosphorescent screen as claimed in claim 1 wherein said unsaturated crosslinkable polymer is an acrylated epoxy resin which is a condensation product of epichlorohydrin, bisphenol-A and an acrylic monomer.

9. A phosphorescent screen as claimed in claim 1 wherein said unsaturated crosslinkable polymer is an acrylated epoxy resin of the formula:

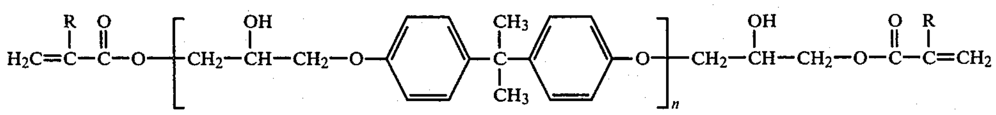

wherein R is a hydrogen atom or a methyl group and n is 1 to 20.

10. A phosphorescent screen as claimed in claim 1 wherein said unsaturated crosslinkable polymer is an acrylated epoxy resin of the formula:

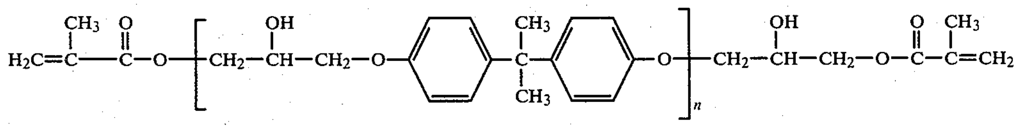

wherein n has a value of about 13.

11. A phosphorescent screen as claimed in claim 1 wherein said polymerizable acrylic monomer is butyl acrylate.

12. A phosphorescent screen as claimed in claim 1 wherein said thermoplastic polyurethane elastomer is a polyester-based polyurethane.

13. A phosphorescent screen as claimed in claim 1 wherein said thermoplastic polyurethane elastomer is a polyether-based polyurethane.

14. A phosphorescent screen as claimed in clim 1 wherein said thermoplastic polyurethane elastomer is a reaction product of 1,4-butanediol, adipic acid and toluenediisocyanate.

15. A phosphorescent screen as claimed in claim 1 wherein said heat-activatable polymerization initiator is an azo initiator.

16. A phosphorescent screen as claimed in claim 1 wherein said heat-activatable polymerization initiator is 2,2'-azobis(isobutyronitrile).

17. A phosphorescent screen as claimed in claim 1 wherein said unsaturated crosslinkable polymer is a mixture of an acrylated epoxy resin and an acrylated urethane resin.

18. A phosphorescent screen as claimed in claim 1 wherein said second component is an organic liquid having a normal boiling point in the range from about 40° C. to about 85° C.

19. A phosphorescent screen as claimed in claim 1 wherein said second component is a ketone.

20. A phosphorescent screen as claimed in claim 1 wherein said second component is methyl ethyl ketone.

21. A phosphorescent screen as claimed in claim 1 wherein said support is a polyester film.

22. A phosphorescent screen as claimed in claim 1 wherein said support is a poly(ethylene terephthalate) film.

23. A phosphorescent screen as claimed in claim 1 wherein said support is a silver coated polyester film.

24. A phosphorescent screen as claimed in claim 1 where said support is baryta-coated paper.

25. A phosphorescent screen as claimed in claim 1 wherein the phosphor coverage of said screen is in the range from about 10 to about 100 grams/ft$^2$.

26. A phosphorescent screen as claimed in claim 1 wherein said polyurethane elastomer is uniformly distributed throughout said matrix.

27. A phosphorescent screen comprising a support and a layer of a composition comprising finelydivided phosphor particles in a heat-cured, crosslinked, void-containing polymeric matrix resulting from the heating of a mixture comprising:

(a) an unsaturated crosslinkable polymer,
(b) a polymerizable acrylic monomer,
(c) a thermoplastic polyurethane elastomer,
(d) a heat-activatable polymerization initiator, and
(e) a component that evaporates during said heating to form said voids.

28. A phosphorescent screen as claimed in claim 27 wherein said evaporable component is an organic liquid having a normal boiling point in the range from about 40° C. to about 85° C.

29. A method for the manufacture of a phosphorescent screen, said method comprising the steps of:

(1) coating a support with a heat-curable composition comprising a suspension of finely-divided phosphor particles in a viscous liquid composition, said viscous liquid composition comprising a first component that is capable of being heatcured to form a cross-linked polymeric matrix surrounding said phosphor particles and a second component that is capable of being evaporated to generate voids within said matrix, said first component comprising:

(a) an unsaturated crosslinkable polymer, (b) a polymerizable acrylic monomer, (c) a thermoplastic polyurethane elastomer, and (d) a heat-activatable polymerization initiator, and (2) heating said coating for a time and at a temperature sufficient to cure said first component, to thereby form a cross-linked polymeric matrix surrounding said phosphor particles, and to evaporate said second component, to thereby generate voids within said matrix.

30. A method as claimed in claim 29 wherein said second component is an organic liquid having a normal boiling point in the range from about 40° C. to about 85° C.

31. A method as claimed in claim 29 wherein said second component is present in said viscous liquid composition in an amount sufficient to provide a void content in said phosphor layer in the range of from about 5 to about 15 percent by volume.

32. A method as claimed in claim 29 wherein said heating is carried out for a period of from about 5 to about 30 minutes at a temperature in the range from about 50° C. to about 150° C.

33. A method as claimed in claim 29 wherein said support is a poly(ethlene terehthalate) film.

34. A method as claimed in claim 29 wherein said unsaturated crosslinkable polymer is an acrylated epoxy resin, said polymerizable acrylic monomer is butyl acrylate, and said heat-activatable polymerization initiator is 2,2'-azobis(isobutyronitrile).

35. A coating composition which is useful in the manufacture of phosphorescent screens, said composition comprising a suspension of finely-divided phosphor particles in a liquid medium, said liquid medium including a first component that is capable of being heat-cured to form a cross-linked polymeric matrix surrounding said phosphor particles and a second component that is capable of being evaporated to generate voids within said matrix, said first component comprising:

(a) an unsaturated crosslinkable polymer, (b) a polymerizable acrylic monomer, (c) a thermoplastic polyurethane elastomer, and (d) a heat-activatable polymerization initiator.

36. A coating composition as claimed in claim 35 wherein said phosphor is europium-activated barium strontium sulfate.

37. A coating composition as claimed in claim 35 wherein said second component is an organic liquid having a normal boiling point in the range from about 40° C. to about 85° C.

38. A coating composition as claimed in claim 35 wherein said second component is methyl ethyl ketone.

39. A coating composition as claimed in claim 35 wherein said unsaturated crosslinkable polymer is an acrylated epoxy resin, said polymerizable acrylic monomer is butyl acrylate, and said heat-activatable polymerization initiator is 2,2'-azobis (isobutyronitrile).

* * * * *